United States Patent
Rusch et al.

(10) Patent No.: US 9,657,624 B2
(45) Date of Patent: May 23, 2017

(54) ASSEMBLY AND METHOD FOR INTRODUCING A REDUCING AGENT INTO THE EXHAUST PIPE OF AN EXHAUST SYSTEM OF AN INTERNAL COMBUSTION ENGINE

(71) Applicant: Faurecia Emissions Control Technologies, Germany GMBH, Augsburg (DE)

(72) Inventors: Klaus Rusch, Gersthofen (DE); Rolf Kaiser, Augsburg (DE); Erich Forster, Grossaitingen (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 0 days.

(21) Appl. No.: 15/097,967

(22) Filed: Apr. 13, 2016

(65) Prior Publication Data

US 2016/0222854 A1    Aug. 4, 2016

Related U.S. Application Data (63) Continuation of application No. 12/670,126, filed as application No. PCT/EP2008/005170 on Jun. 25, 2008.

(30) Foreign Application Priority Data

Jul. 24, 2007   (DE) .................. 10 2007 034 316
Feb. 4, 2008   (DE) ................. 20 2008 001 547 U (51) Int. Cl.
*F01N 3/00*   (2006.01)
*F01N 3/20*   (2006.01)
(Continued)

(52) U.S. Cl.
CPC .......... *F01N 3/206* (2013.01); *F01N 3/2066* (2013.01); *F01N 3/2892* (2013.01); *F01N 13/08* (2013.01);
(Continued)

(58) Field of Classification Search
CPC ............. F01N 2240/20; F01N 2610/02; F01N 2610/08; F01N 2610/1453; F01N 3/2066
(Continued)

(56) References Cited

U.S. PATENT DOCUMENTS

| 5,606,856 A | 3/1997 | Linder |
| 6,539,708 B1 | 4/2003 | Hofmann |

(Continued)

FOREIGN PATENT DOCUMENTS

| DE | 19806265 | 7/2004 |
| DE | 10312212 | 9/2006 |

(Continued)

*Primary Examiner* — Audrey K Bradley
*Assistant Examiner* — Anthony Ayala Delgado
(74) *Attorney, Agent, or Firm* — Barnes & Thornburg, LLP (57) ABSTRACT

An assembly (10) for introducing a reducing agent into the exhaust pipe (12) of an exhaust system of an internal combustion engine, in particular of a motor vehicle, has a feed connector (14) which opens into the exhaust pipe (12) and includes a wall (16), a feed device (20) for reducing agents which opens into the feed connector (14), and a device (22) for generating a gas flow (G) which is additional to the reducing agent flow (R) and lines the wall (16) of the feed 10 connector (14). Furthermore, there is described a method of introducing a reducing agent into the exhaust pipe (12) of an exhaust system of an internal combustion engine, in particular of a motor vehicle.

20 Claims, 5 Drawing Sheets

(51) Int. Cl.
  *F01N 13/08* (2010.01)
  *F01N 3/28* (2006.01)

(52) U.S. Cl.
  CPC ............ *B01D 2251/206* (2013.01); *B01D 2251/2062* (2013.01); *B01D 2259/12* (2013.01); *F01N 2240/20* (2013.01); *F01N 2260/022* (2013.01); *F01N 2470/00* (2013.01); *F01N 2610/02* (2013.01); *F01N 2610/08* (2013.01); *F01N 2610/1453* (2013.01); *Y02T 10/24* (2013.01)

(58) Field of Classification Search
  USPC ............................................ 60/286
  See application file for complete search history.

(56) References Cited

U.S. PATENT DOCUMENTS

| | | | |
|---|---|---|---|
| 7,509,799 B2 * | 3/2009 | Amou | B01D 53/9431 60/286 |
| 8,438,839 B2 | 5/2013 | Floyd | |
| 8,800,276 B2 | 8/2014 | Levin | |
| 9,180,407 B2 | 11/2015 | De Rudder | |
| 2003/0110763 A1 | 6/2003 | Pawson | |
| 2003/0226412 A1 | 12/2003 | Rumminger | |
| 2006/0070374 A1 | 4/2006 | Gaiser | |
| 2006/0218902 A1 | 10/2006 | Arellano | |
| 2007/0092413 A1 | 4/2007 | Hirata | |
| 2007/0163241 A1 | 7/2007 | Meingast | |
| 2007/0193252 A1 | 8/2007 | McKinley | |
| 2008/0011777 A1 | 1/2008 | Cooke | |
| 2008/0011780 A1 | 1/2008 | Cooke | |
| 2008/0022670 A1 | 1/2008 | Ichikawa | |
| 2008/0092526 A1 | 4/2008 | Kunkel | |
| 2008/0163612 A1 | 7/2008 | Gaiser | |
| 2008/0282687 A1 | 11/2008 | Park | |
| 2009/0044524 A1 | 2/2009 | Fujino | |
| 2009/0084094 A1 | 4/2009 | Goss | |
| 2009/0120066 A1 | 5/2009 | VanderGriend | |
| 2009/0127511 A1 | 5/2009 | Bruck | |
| 2010/0005790 A1 | 1/2010 | Zhang | |
| 2010/0071355 A1 | 3/2010 | Brown | |
| 2010/0101222 A1 | 4/2010 | Oesterle | |
| 2010/0186393 A1 | 7/2010 | Kowada | |
| 2011/0107743 A1 | 5/2011 | Ranganathan | |

FOREIGN PATENT DOCUMENTS

| | | |
|---|---|---|
| DE | 102005061145 | 6/2007 |
| DE | 102007052262 | 5/2009 |
| DE | 102008008563 | 8/2009 |
| DE | 102008040476 | 4/2013 |
| DE | 10241697 | 5/2016 |
| EP | 0268026 | 8/1993 |
| EP | 1314864 | 1/2007 |
| EP | 2282026 | 2/2011 |
| SE | 531199 | 1/2009 |
| WO | 2008027146 | 3/2008 |
| WO | 2008034981 | 3/2008 |
| WO | 2010078052 | 7/2010 |

* cited by examiner

ASSEMBLY AND METHOD FOR INTRODUCING A REDUCING AGENT INTO THE EXHAUST PIPE OF AN EXHAUST SYSTEM OF AN INTERNAL COMBUSTION ENGINE

PRIORITY CLAIM

This application is a continuation of U.S. application Ser. No. 12/670,126 filed Apr. 27, 2010, which is a national stage entry under 35 USC §371(b) of PCT International Application No. PCT/EP2008/005170, filed Jun. 25, 2008, and claims the benefit of German Patent Application No. 102007034316.9, filed Jul. 24, 2007, and of German Patent Application No. 202008001547.2, filed Feb. 4, 2008, each of which are expressly incorporated by reference herein.

BACKGROUND

The present invention relates to an assembly for introducing a reducing agent into the exhaust pipe of an exhaust system of an Internal combustion engine, in particular of a motor vehicle. The present invention further relates to a method of introducing a reducing agent into the exhaust pipe of an exhaust system of an internal combustion engine, in particular of a motor vehicle.

To comply with specifications relating to environmental laws, exhaust gases such as those of motor vehicles driven by internal combustion engines need to be subjected to a purification. In particular, for nitrogen oxide reduction, so-called SCR catalytic converters (also referred to as denitrification catalysts) are increasingly employed, which selectively reduce nitrogen oxides (NOx) generated in the engine during combustion to form water and nitrogen with the aid of ammonia ($NH_3$) intermediately stored in the SCR catalytic converter. The provision of the ammonia required for the selective catalytic reduction is effected by a hydrolysis of urea which is added to the exhaust gas usually in a dissolved form.

Systems known from the prior art utilize an injection valve, for example a low pressure fuel Injection valve, to introduce an aqueous urea solution into the exhaust pipe upstream of an SCR catalytic converter. Such valves produce a fine mist of urea in the region of the valve tip which may deposit on the wall of the exhaust pipe. This is a problem in particular in the low-load, low-temperature operation of the internal combustion engine, in which the deposits are not vaporized again and may completely block the exhaust pipe in this way.

SUMMARY

The present invention provides an assembly and a method for introducing a reducing agent into the exhaust pipe of an exhaust system of an internal combustion engine, which allow urea deposits to be avoided or at least greatly reduced.

In accordance with the invention, this is achieved by an assembly of the type initially mentioned, having a feed connector which opens into the exhaust pipe and includes a wall, a feed device for reducing agents which opens Into the feed connector, and a device for generating a gas flow which is additional to the reducing agent flow and lines the wall of the feed connector. This additional gas flow (which is also different from the main exhaust gas flow in the exhaust pipe) is at least largely free of reducing agent and prevents any mist produced upon injection of a reducing agent from depositing on the walls of both the feed connector and the exhaust pipe.

The additional gas flow may be fresh air, in particular compressed air. To this end, a compressed air pipe available in the vehicle is preferably made use of for supplying the device.

Alternatively or additionally, the additional gas flow may be exhaust gas which is branched off from the main exhaust gas flow preferably upstream of a turbocharger, as a result of which a desirable increased pressure is available in the exhaust gas.

According to a preferred embodiment of the invention, the device includes an inlet opening for the gas flow, which is in fluid communication with, e.g., a fresh air duct or with the exhaust pipe.

The inlet opening may be arranged in the wall of the feed connector. It is also possible for the inlet opening to be formed in the region of the orifice of the feed connector into the exhaust pipe. Preferably, the inlet opening is then situated on the side of the orifice that is upstream with respect to the exhaust gas flow, that is, part of the exhaust gas flow from the exhaust pipe flows through the inlet opening into the region of the orifice of the feed connector. According to a further development of the invention, the device includes a guide member which is arranged in the feed connector to dictate the desired direction for the additional gas flow.

Preferably, the guide member extends from the feed device at least partially along the wall of the feed connector. In the region of the feed device or a mount for the feed device, the guide member more particularly rests directly against the wall. This prevents any reducing agent from reaching an area between the guide member and the wall.

The guide member may line the wall of the feed connector, a gap being formed at least in sections between the wall and the guide member. Preferably, both the wall and the guide member are of a conical shape, the wall having the larger opening angle towards the orifice. In this way, a gap that becomes increasingly larger is produced towards the orifice of the feed connector; the additional gas flow is conducted through this gap.

According to one embodiment of the invention, the guide member projects at least partially into the exhaust pipe. The guide member is made to be particularly long here and additionally serves as a wall that is heated by the gas flow and causes a vaporization of any deposits. As an alternative, the guide member may also be configured to be very short and serve exclusively for steering the gas flow.

Advantageously, a section of the guide member extends into the exhaust pipe on the side of the orifice that is upstream with respect to the exhaust gas flow. As already mentioned above, an inlet opening is formed in this way, which directs part of the exhaust gas flow into the feed connector to form the additional gas flow. Alternatively or additionally, it is, of course, also possible for a section of the guide member to extend into the exhaust pipe on the side of the orifice that is downstream with respect to the exhaust gas flow.

The guide member may include a continuously surrounding peripheral wall. It is likewise conceivable that the guide member lines only a partial region of the feed connector with respect to the periphery, such as, e.g., a region that is especially susceptible to deposits.

In addition, the guide member may include one or more openings in its peripheral wall, through which the gas flow is guided into that region of the feed connector which is inside with respect to the guide member. Here, the use of a porous material is also conceivable. The guide member may, of course, also be designed without any openings, i.e. closed, in particular if it is made rather short.

The device is preferably configured such that the gas flow is formed as a swirl flowing in the feed connector, something which enhances the mixing in the feed connector. This swirling of the gas flow in the feed connector may be attained by a suitably designed and arranged guide member and/or an oblique inlet opening.

More specifically, the feed connector is arranged at an angle of from 20° to 70° in relation to the exhaust pipe, which results in a particularly favorable distribution of the reducing agent supplied.

For a better mixing of the supplied reducing agent with the exhaust gas flow, a mixing element for causing a swirling of the exhaust gas flow is advantageously arranged in the exhaust pipe downstream of the feed connector.

The exhaust pipe may have a bend of approx. 20° to 70° in the region of the feed connector. Preferably, the bend of the exhaust pipe roughly corresponds to the angle between the exhaust pipe and the feed connector. It is also possible to arrange the feed connector on a section of the exhaust pipe extending in a straight line.

As already mentioned at the outset, the reducing agent more particularly is an aqueous urea solution or a solution of other substances releasing ammonia. The invention can, however, also be employed to advantage when fuel is used as the reducing agent.

A particularly cost-effective configuration is obtained in that the feed device is an injection valve, in particular a low-pressure fuel injection valve.

According to a second aspect of the invention, a method of introducing a reducing agent into the exhaust pipe of an exhaust system of an internal combustion engine, in particular of a motor vehicle, is provided. The method according to the invention includes the following steps:

generating a gas flow which is additional to the reducing agent flow and is at least largely free of reducing agent and lines a wall of a feed connector opening into the exhaust pipe;

injecting the reducing agent by means of a feed device arranged on the feed connector.

As already discussed in relation to the assembly according to the invention, the reducing agent deposits occurring in the prior art are effectively prevented by the method according to the invention as well.

BRIEF DESCRIPTIONS OF THE DRAWINGS

Further features and advantages of the invention will be apparent from the following description of several preferred embodiments with reference to the accompanying drawings, in which.

DETAILED DESCRIPTION

Figure 1:
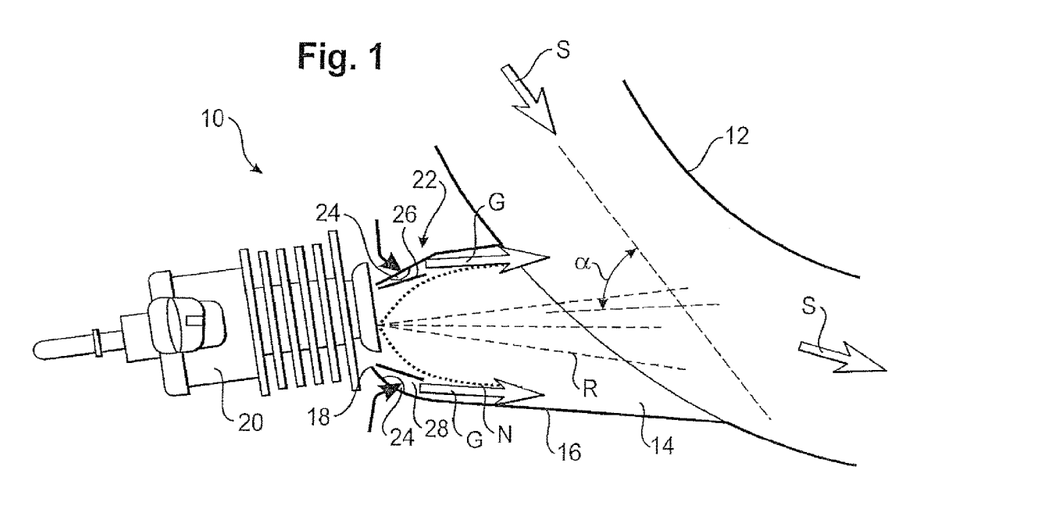
FIG. 1 shows a schematic sectional view of an assembly according to a first embodiment of the invention for carrying out the method according to the invention.

FIG. 1 schematically shows an assembly 10 according to the invention for introducing a reducing agent into an exhaust pipe 12 of an exhaust system of an internal combustion engine. In particular, the exhaust system of a motor vehicle is involved. The exhaust gas flow in the exhaust pipe 12 is denoted by S. The assembly 10 includes a feed connector 14 which is of a substantially conical configuration and opens into the exhaust pipe 12, preferably at an angle a of between 20° and 70° here approx. 55° The (inside) wall of the feed connector 14 bears the reference number 16.

Figure 5:
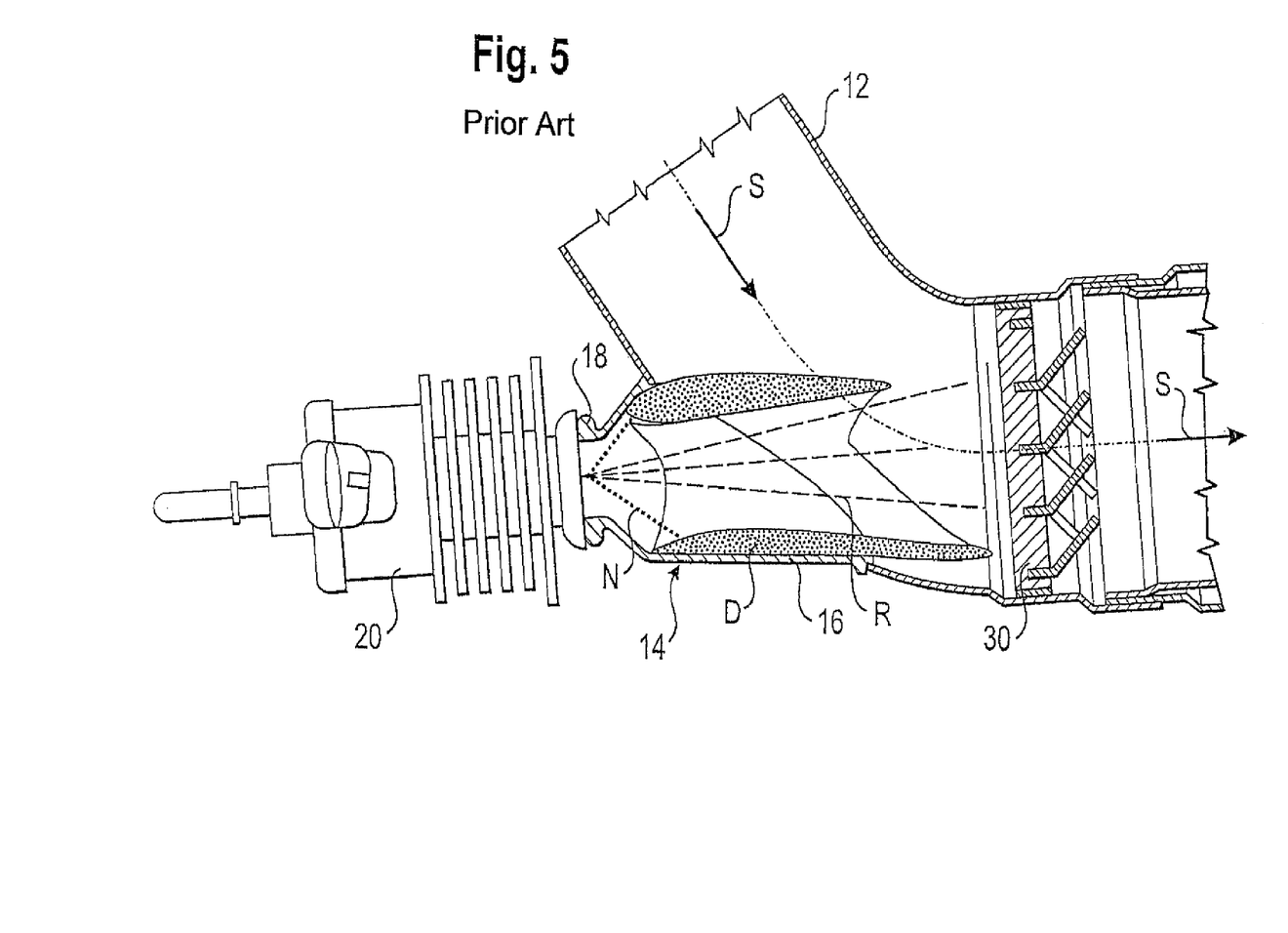
FIG. 5 shows a sectional view of an assembly according to the prior art, which illustrates the problem underlying the invention.

Arranged in a mount 18 provided at the end of the feed connector 14 that is opposite to the exhaust pipe 12 is a feed device 20 for reducing agents, which opens into the feed connector 14 and which is an injection valve, in this case a low-pressure fuel injection valve. The reducing agent preferably is an aqueous urea solution which is introduced into the exhaust pipe 12 upstream of an SCR catalytic converter not shown in FIG. 1. Departing from the configuration shown, it is not absolutely necessary to provide a mount for the feed device 20; the latter may also be welded to the feed connector, for example. To avoid urea deposits D when the urea solution is introduced, as occur in feed devices 20 according to the prior art and are schematically shown in FIG. 5, the assembly 10 according to the invention (FIG. 1) includes a device 22 which serves to 10 generate a gas flow G that is additional to the reducing agent flow R and lines the wall 16 of the feed connector 14.

The device 22 comprises of at least one, in the present case a plurality of inlet openings 24 arranged in the wall 16 for the gas flow G which involves fresh air, more particularly compressed air, or else exhaust gas which is branched off of the feed connector 14. The device 22 furthermore comprises a guide member 26 arranged in the feed connector 14.

To feed the ammonia required for nitrogen oxide reduction to an SCR catalytic converter connected downstream of the assembly 10, according to the invention a gas flow G additional to the reducing agent flow R is generated in the region of the feed connector 14, the additional gas flow G being at least largely free of reducing agent and annularly lining the wall 16 of the feed connector. To this end the gas flow G enters through the openings 24 into the feed connector 14 and is deflected by the guide member 26, so that the gas flow G flows along the wall 16 of the feed connector 14 and practically covers the wall 16 from the reducing agent flow R. At the same time, the reducing agent is injected into the feed connector 14 and thereby into the exhaust pipe 12 with the aid of the feed device 20, the guide member 26 directing the gas flow G such that the reducing agent flow R is, as it were, sheathed, and in this way preventing the fine mist of urea N developing at the tip of the feed device 20 from being able to deposit on the wall 16 or on a wall of the exhaust pipe 12.

Figure 2:
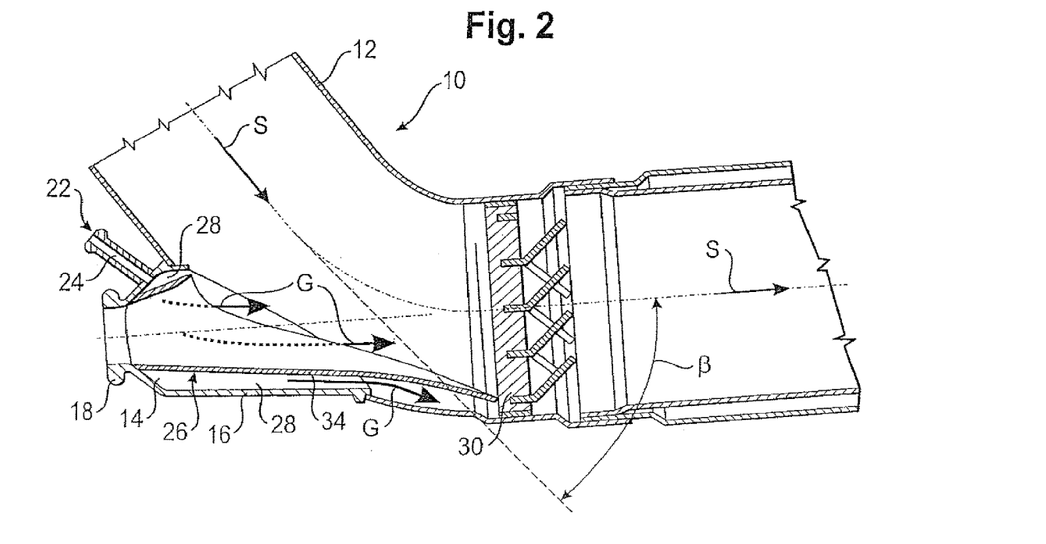
FIG. 2 shows a sectional view of an assembly according to a second embodiment of the invention.
Figure 3:
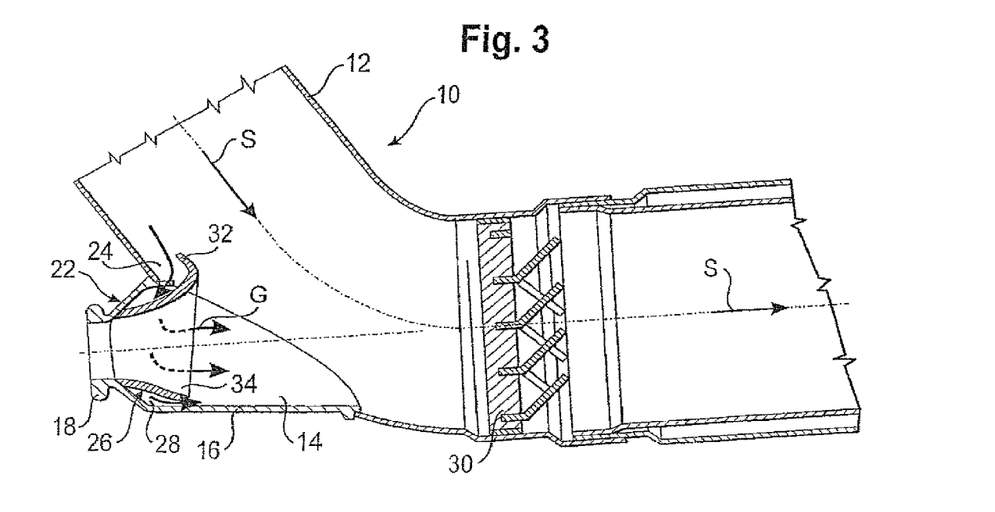
FIG. 3 shows a sectional view of an assembly according to a third embodiment of the Invention.
Figure 4:
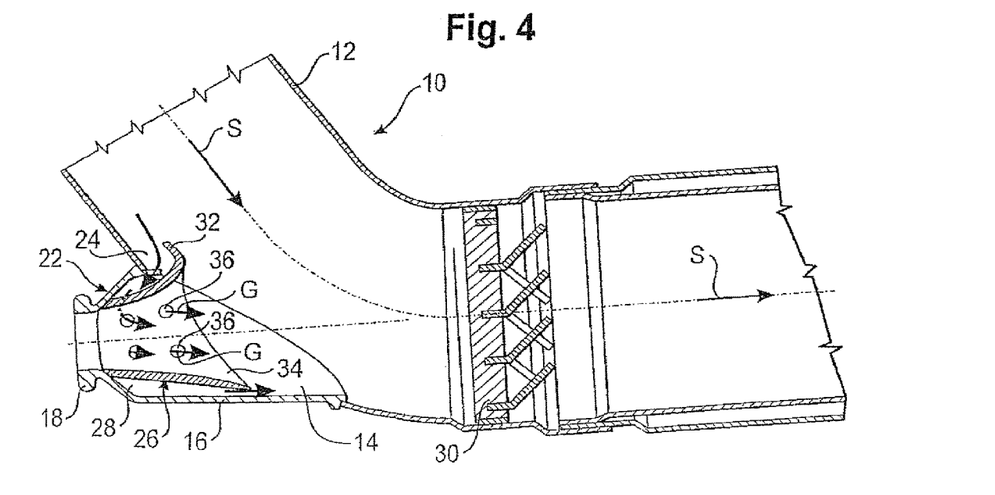
FIG. 4 shows a sectional view of an assembly according to a fourth embodiment of the Invention.

FIGS. 2 to 4 show further embodiments of the assembly 10 according to the invention that are modified as compared with FIG. 1. Identical or functionally identical components will be denoted by the same reference numbers below, and only the differences from the assembly 10 described so far will be discussed.

In the embodiment according to FIG. 2, only one inlet opening 24 is provided, which is again arranged in the wall 16 of the feed connector 14 and is in fluid communication with a compressed air pipe of the vehicle or with the exhaust pipe upstream of a turbocharger or upstream of the reducing agent injection. The gas flow G flows through the inlet opening 24 and reaches a gap 28 formed between the wall 16 and the guide member 26. In the embodiment shown, the guide member 26 extends from the mount 18 for the feed device 20 (not shown here) along the wall 16 of the feed connector 14 and lines the wall 16. Just like the feed connector 14, the guide member 26 has a conical shape, but, compared with the region of the feed connector 14 close to the mount 18, it has a smaller opening angle towards the orifice into the exhaust pipe 12. In the embodiment shown, the guide member 26 extends over the entire length of the feed connector 14 and in the lower, downstream region even partly into the exhaust pipe 12, here up to a static mixing element 30 arranged downstream of the feed connector 14, the guide member 26 serving as a heated wall which (in addition to directing the gas flow G) favors a vaporization of any deposits.

In the region of the feed connector 14, the exhaust pipe 12 has a bend the angle β of which likewise amounts to between 20° and 70°, here 55°. Owing to the bend of the exhaust pipe 12 and the angled arrangement of the feed connector 14 in relation to the exhaust pipe 12, the reducing agent flow R flows roughly perpendicularly against the mixing element 30. The feed connector 14 may, of course, also be arranged on a section of the exhaust pipe 12 extending in a straight line (not shown).

FIG. 3 shows a further embodiment of the assembly 10 according to the invention, in which the guide member 26 (as in the embodiment shown in FIG. 1) is of a comparatively short configuration and extends only partly along the wall 16 of the feed connector 14 (at least in the lower, downstream region). On that side of the orifice of the feed connector 14 into the exhaust pipe 12 that is upstream in relation to the exhaust gas flow S, a bent section 32 of the guide member 26 extends into the exhaust pipe 12 and thereby defines an inlet opening 24 which directs part of the exhaust gas flow S into the feed connector 14 or into the gap 28 between the guide member 26 and the wall 16. The inlet opening 24 is thus formed in the region of the orifice of the feed connector 14 into the exhaust pipe 12 here. A separate inlet opening 24 for the gas flow G is not necessary, as a result of which a particularly simple design is obtained. As with the other embodiments shown so far, the guide member 26 has a closed peripheral wall 34.

As shown in FIG. 4, the guide member 26 may also have a plurality of openings 36 in its peripheral wall 34 to guide the gas flow G into the region of the feed connector 14 that is inside with respect to the guide member 26. Also conceivable is the use of a porous material to manufacture the guide member 26.

Figure 6:
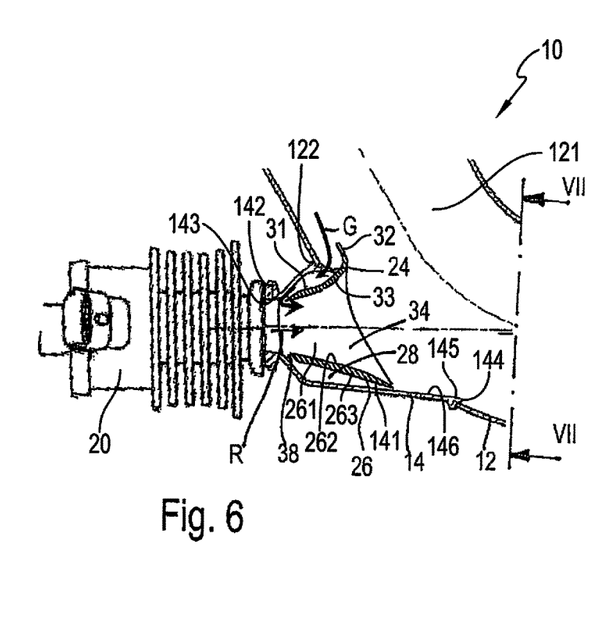
FIG. 6 shows a sectional view of an assembly according to a fifth embodiment of the invention.
Figure 7:
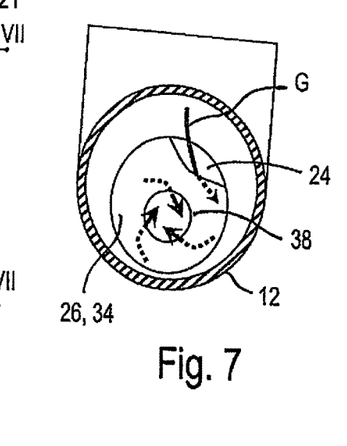
FIG. 7 shows a sectional view on the feed connector according to the line VII-VII in FIG. 6.
Figure 8:
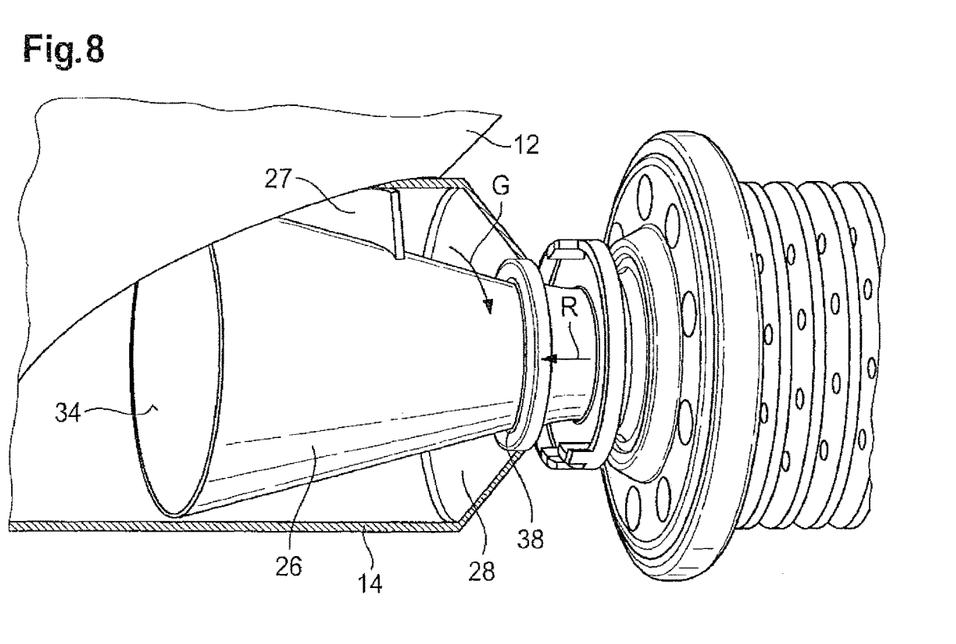
FIG. 8 shows an enlarged side view of the assembly according to the fifth embodiment, with the feed connector partly cut open.

According to the embodiment as shown in FIGS. 6 to 8, the device is configured in such a way that the gas flow G is in the form of a swirl flowing in the feed connector 14, something which enhances the mixing of the reducing agent R in the gas flow G as early as in the feed connector 14. This swirling of the gas flow G in the feed connector 14 may be attained by a suitably configured and arranged guide member 26 and/or an oblique inlet opening. In the embodiment illustrated, the inlet opening 24 into the gap 28 is positioned so as to be eccentric (see FIG. 7), so that a swirl is already formed in the gap 28 which then impinges as such on the reducing agent R via an annular opening 38 between the beginning of the guide member 26 and the beginning of the connector 14. As seen in FIG. 8, attached to the guide member 26 is a helically bent, short deflection part 27 which is located between the guide member 26 and the feed connector 14 to direct the gas around the conical guide member 26 towards the annular opening 38. The deflection part 27 is to be considered a section of the guide member 26. The gas for one thing mixes with the reducing agent R and, for another thing, comes to lie against the inside of the tubular guide member 26, likewise in the form of a swirl. In this embodiment the guide member 26 is connected with the feed connector 14 at some points (not shown).

The assembly according to the invention provides a solution that Is simple to manufacture and therefore cost-effective, for avoiding any undesirable reducing agent deposits when a reducing agent Is introduced into the exhaust pipe of an exhaust system.

Apparatus 10 includes an exhaust pipe 12, a feed connector 14, and a sleeve-shaped guide 26 as shown in FIG. 6. The exhaust pipe 12 is formed to include an exhaust passageway 121 that is adapted to conduct an exhaust gas G to a catalytic converter and a side aperture 122 opening into the exhaust passageway 121 as shown in FIG. 6. The feed connector 14 is formed to include a feed-connector channel 141 that extends from a feed device 20 for reducing agents to the exhaust pipe 12 as shown in FIG. 6. The sleeve-shaped guide 26 is arranged in the feed-connector channel 141 of the feed connector 14 and includes a reducing-agent passageway 261 adapted to conduct a flow of reducing agent R from outside the exhaust pipe 12 to the exhaust passageway 121 inside the exhaust pipe 12 as shown in FIG. 6. The sleeve-shaped guide 26 is mounted to form annular gap 28 and an annular opening 38 between the sleeve-shaped guide 26 and the feed connector 14 that admits exhaust gas G into the sleeve-shaped guide 26 to flow along the sleeve-shaped guide 26 and blocks deposition of matter entrained in the flow of reducing agent R on the sleeve-shaped guide 26 as suggested in FIG. 6 and described elsewhere herein.

The feed connector 14 includes an inlet end 142 coupled to the feed device 20, an outlet end 144 coupled to the exhaust pipe 12, and an inner surface 146 that extends from the inlet end 142 to the outlet end 144 as shown in FIG. 6. The inlet end 142 is formed to include inlet aperture 143 that is adapted to receive flow of reducing agent R from the feed device 20 as shown in FIG. 6. The outlet end 144 is formed to include an outlet aperture 145 that opens into the exhaust passageway 121 as shown in FIG. 6. The inner surface 146 defines the feed-connector channel 141 such that the feed-connector channel 141 extends from the inlet end 142 to the outlet end 144 as shown in FIG. 6.

The sleeve-shaped guide 26, sometimes called a guide member 26, includes an inner surface 262 that defines the reducing-agent passageway 261 and an outer surface 263 arranged to face away from the reducing-agent passageway 261 as shown in FIG. 6. The sleeve-shaped guide 26 is arranged to lie in the feed-connector channel 141 such that the outer surface 243 of the sleeve-shaped guide 26 lies in spaced-apart relation to the inner surface 146 of the feed connector 14 to define an annular gap 28 therebetween as shown in FIG. 6. The annular gap 28 opens into the exhaust passageway 121 to allow exhaust gas G flowing in the exhaust passageway 121 to flow into the feed-connector passageway 141 as shown FIG. 6.

The sleeve-shaped guide 26 includes an intake section 31, an exit section 33, and a bent section 32 as shown in FIG. 6. The intake section 31, the exit section 33, and the bent section 32 of the sleeve-shaped guide 26 are closed and are formed without openings to admit gas flow G into the reducing-agent passageway 261 as shown in FIG. 6 and discussed elsewhere herein. The intake section 31 and the exit section 33 of the sleeve-shaped guide 26 flare outwardly as the sleeve-shaped guide 26 extends toward the exhaust passageway 121 as shown in FIG. 6.

The intake section 31 is aligned with the inlet end 142 of the feed connector 14 and formed to open toward the inlet end 142 of the feed connector 14 to cause the flow of reducing agent R passing through the inlet aperture 143 of the feed connector 14 to flow into the reducing-agent passageway 261 as shown in FIG. 6. The intake section 31 of the sleeve-shaped guide 26 is spaced apart from the inlet end 142 of the feed connector 14 to define an annular opening 38 as shown in FIG. 6. The annular opening 38 conducts exhaust gas G from the feed-connector channel 141 into the reducing-agent passageway 361 as shown in FIG. 6.

The exit section 33 is formed to open toward the exhaust passageway 121 formed in the exhaust pipe 12 to cause the flow of reducing agent R extant in the reducing-agent passageway 261 to combine in the exhaust passageway 261 with exhaust gas G flowing through the exhaust passageway 121 toward the catalytic converter as shown in FIG. 6. The exit section 33 of the sleeve-shaped guide 26 terminates at a location in the feed-connector channel 141 formed in the feed connector 14 as shown in FIG. 6. Exhaust gas G flowing in the annular gap 28 to flow along the inner surface 146 of the feed connector 14 blocks deposition of matter entrained in the flow of reducing agent R exiting the reducing-agent passageway 261 on a portion of the inner surface 146 of the feed connector 14 that is located between the sleeve-shaped guide 26 and the exhaust pipe 12 as shown in FIG. 6.

The bent section 32 is coupled to the exit section 33 of the sleeve-shaped guide 26 and extends upstream from the exit section 33 as shown in FIG. 6. The bent section 32 of the sleeve-shaped guide 26 is configured to provide means for diverting exhaust gas G flowing through the exhaust passageway 121 of the exhaust pipe 12 into the annular gap 28 and through the reducing-agent passageway 261 for discharge into the exhaust passageway 121 of the exhaust pipe 12 downstream of the bent section 32 to block deposition of matter entrained in the flow of reducing agent R exiting the reducing-agent passageway 261 on the inner surface 262 of the sleeve-shaped guide 26 as shown in FIG. 6.

The apparatus 10 includes a feed device 20 for discharging the reducing agent comprising an aqueous urea solution under pressure through the inlet aperture formed in the inlet end of the feed connector 14 into the reducing-agent passageway to establish the flow of reducing agent R as shown in FIG. 6 and discussed elsewhere herein. The feed device 20 is located in spaced-apart relation to the exhaust pipe 12 to locate the feed connector 14 therebetween, for example, as shown in FIG. 6. The feed device 20 is located outside of the exhaust passageway formed in the exhaust pipe 12, for example, as shown in FIG. 6. The feed connector 14 and sleeve-shaped guide 26 are configured in such a way that a swirl flowing in the feed connector 14 is induced and enhances mixing of the reducing agent with the exhaust gas, for example, as suggested in FIG. 6 and described elsewhere herein.

The invention claimed is:

1. A reducing agent injection apparatus for use in an exhaust system with a catalytic converter, the apparatus comprising an exhaust pipe formed to include an exhaust passageway adapted to conduct an exhaust gas to the catalytic converter and formed to include a side aperture opening into the exhaust passageway, a feed connector including an inlet end formed to include an inlet aperture adapted to receive a flow of reducing agent comprising an aqueous urea solution from a reducing agent source, an outlet end formed to include an outlet aperture and coupled to the exhaust pipe to cause the outlet aperture to open into the exhaust passageway, and an inner surface arranged to extend from the inlet end to the outlet end to define a feed-connector channel extending from the inlet end to the outlet end, and a sleeve-shaped guide having (i) an inner surface arranged to define a reducing-agent passageway and (ii) an outer surface arranged to face away from the reducing-agent passageway, the sleeve-shaped guide including (a) an intake section aligned with the inlet end of the feed connector and formed to open toward the inlet end of the feed connector to cause the flow of reducing agent passing through the inlet aperture of the feed connector to flow into the reducing-agent passageway, (b) an exit section formed to open toward the exhaust passageway formed in the exhaust pipe to cause the flow of reducing agent extant in the reducing-agent passageway to combine in the exhaust passageway with exhaust gas flowing through the exhaust passageway toward the catalytic converter, and (c) a bent section coupled to the exit section and arranged to extend upstream from the exit section in the exhaust passageway, the sleeve-shaped guide being arranged in the feed-connector channel to cause the outer surface of the sleeve-shaped guide to lie in spaced-apart relation to the inner surface of the feed connector to define an annular gap therebetween that opens into the exhaust passageway to allow exhaust gas flowing in the annular gap to flow into the exhaust passageway, and wherein the bent section is shaped to divert exhaust gas flowing through the exhaust passageway of the exhaust pipe into the annular gap and through the reducing-agent passageway of the sleeve-shaped guide for discharge back into the exhaust passageway of the exhaust pipe downstream of the bent section to block deposition of matter entrained in the flow of reducing agent exiting the reducing-agent passageway on the inner surface of the sleeve-shaped guide.

2. The apparatus of claim 1, wherein an annular opening is formed between the intake section of the sleeve-shaped guide where the flow of reducing agent enters the reducing-agent passageway and the inlet end of the feed connector where the flow of reducing agent enters the feed-connector channel.

3. The apparatus of claim 2, wherein the intake section, the exit section, and the bent section of the sleeve-shaped guide are closed and are formed without openings to admit gas flow into the reducing-agent passageway.

4. The apparatus of claim 1, wherein an annular opening is formed between the intake section of the sleeve-shaped guide and a beginning of the feed connector.

5. The apparatus of claim 4, wherein the intake section and the exit section of the sleeve-shaped guide flare outwardly as the sleeve-shaped guide extends toward the exhaust passageway formed by the exhaust pipe.

6. The apparatus of claim 1, further comprising feed device for discharging the reducing agent under pressure through the inlet aperture formed in the inlet end of the feed connector into the reducing-agent passageway to establish the flow of reducing agent, wherein the feed device is located in spaced-apart relation to the exhaust pipe to locate the feed connector therebetween.

7. The apparatus of claim 6, wherein the feed device is located outside of the exhaust passageway formed in the exhaust pipe.

8. The apparatus of claim 7, wherein the feed connector and sleeve-shaped guide are configured in such a way that a swirl flowing in the feed connector is induced and enhances mixing of the reducing agent with the exhaust gas.

9. A reducing agent injection apparatus for use in an exhaust system with a catalytic converter, the apparatus comprising
- a feed connector arranged upstream of the catalytic converter, including an inlet end formed to include an inlet aperture adapted to receive a flow of reducing agent comprising an aqueous urea solution from a reducing agent source, an outlet end formed to include an outlet aperture adapted to open into an exhaust passageway, and an inner surface arranged to extend from the inlet end to the outlet end to define a feed-connector channel extending from the inlet end to the outlet end, and
- a sleeve-shaped guide having (i) an inner surface arranged to define a reducing-agent passageway and (ii) an outer surface arranged to face away from the reducing-agent passageway, the sleeve-shaped guide including an intake section aligned with the inlet end of the feed connector and formed to open toward the inlet end of the feed connector to cause the flow of reducing agent passing through the inlet aperture of the feed connector to flow into the reducing-agent passageway, (b) an exit section formed to open away from the inlet end of the feed connector, and (c) a bent section coupled to the exit section adapted to be located in an exhaust passageway, the sleeve-shaped guide being arranged to lie in the feed-connector channel such that the outer surface of the sleeve-shaped guide lies in spaced-apart relation to the inner surface of the feed connector to define an annular gap therebetween opened to receive exhaust gas outside the feed connector,
- wherein the bent section is shaped to divert exhaust gas flowing through the exhaust passageway of the exhaust pipe into the annular gap and through the reducing-agent passageway for discharge back into the exhaust passageway of the exhaust pipe.

10. The apparatus of claim 9, wherein an annular opening is formed between the intake section of the sleeve-shaped guide where the flow of reducing agent enters the reducing-agent passageway and the inlet end of the feed connector where the flow of reducing agent enters the feed-connector channel.

11. The apparatus of claim 10, wherein the intake section, the exit section, and the bent section of the sleeve-shaped guide are closed and are formed without openings to admit gas flow into the reducing-agent passageway.

12. The apparatus of claim 10, wherein the intake section and the exit section of the sleeve-shaped guide flare outwardly as the sleeve-shaped guide extends toward the exhaust passageway of the exhaust pipe.

13. The apparatus of claim 9, further comprising a feed device for discharging the reducing agent under pressure through the inlet aperture formed in the inlet end of the feed connector into the reducing-agent passageway to establish the flow of reducing agent, wherein the feed device is located in spaced-apart relation to the exhaust pipe to locate the feed connector therebetween.

14. The apparatus of claim 9, wherein the feed connector and sleeve-shaped guide are configured in such a way that a swirl flowing in the feed connector is induced.

15. A reducing agent injection apparatus for use in an exhaust system with a catalytic converter, the apparatus comprising
- an exhaust pipe that defines an exhaust passageway and that is formed to include a side aperture opening into the exhaust passageway,
- a feed connector arranged upstream of the catalytic converter, including (i) an inlet end, (ii) an outlet end, and (iii) an inner surface arranged to extend from the inlet end to the outlet end to define a feed-connector channel extending from the inlet end to the outlet end,
- a feed device configured to discharge reducing agent under pressure through an inlet aperture formed in the inlet end of the feed connector to establish a flow of reducing agent, the flow of reducing agent comprising an aqueous urea solution, and
- a guide arranged in the feed-connector channel of the feed device, the guide having (i) an inner surface that defines a reducing-agent passageway located to conduct the flow of reducing agent discharged by the feed device and (ii) an outer surface that cooperates with the inner surface of the feed connector to define a gap that is in fluid communication with the reducing-agent passageway of the sleeve-shaped guide, the guide including a bent section that extends into the exhaust passageway of the exhaust pipe and shaped to divert exhaust gas flowing through the exhaust passageway of the exhaust pipe into the gap and through the reducing-agent passageway of the sleeve-shaped guide for discharge back into the exhaust passageway of the exhaust pipe.

16. The apparatus of claim 15, wherein the flow of exhaust gas conducted in the gap is at least largely free of reducing agent.

17. The apparatus of claim 15, wherein the feed device is located outside of the exhaust passageway formed in the exhaust pipe.

18. The apparatus of claim 15, wherein the gap defined between the feed connector and the sleeve-shaped guide is fluidly coupled to the reducing-agent passageway defined by the inner surface of the sleeve-shaped guide by an annular opening.

19. The apparatus of claim 18, wherein the feed connector extends through the side aperture formed in the exhaust pipe into the exhaust passageway.

20. The apparatus of claim 18, wherein the feed connector and sleeve-shaped guide are configured in such a way that a swirl flowing in the feed connector is induced and enhances mixing of the reducing agent with the exhaust gas.

* * * * *